United States Patent [19]

Wakatsuki et al.

[11] 4,309,481

[45] Jan. 5, 1982

[54] FILTER-COATED PHOSPHOR

[75] Inventors: Tadashi Wakatsuki, Yokohama; Takeshi Takahara, Yokosuka, both of Japan

[73] Assignee: Tokyo Shibaura Denki Kabushiki Kaisha, Kawasaki, Japan

[21] Appl. No.: 138,510

[22] Filed: Apr. 9, 1980

[30] Foreign Application Priority Data

Apr. 10, 1979 [JP] Japan .................................. 54-42537

[51] Int. Cl.$^3$ ...................... C09K 11/46; H01J 29/28; H01J 29/20
[52] U.S. Cl. .................................... 428/403; 313/466; 313/468; 252/301.4 S; 252/301.4 R; 427/218; 428/407; 428/701; 428/702
[58] Field of Search ............... 428/403, 407, 469, 701, 428/702; 313/466, 468; 427/218; 252/301.4 R, 301.4 S

[56] References Cited

U.S. PATENT DOCUMENTS

| | | | |
|---|---|---|---|
| 2,202,233 | 5/1940 | Schad | 252/301.4 S |
| 3,294,569 | 12/1966 | Messineo | 428/328 |
| 4,020,231 | 4/1977 | Hedler | 428/403 |
| 4,173,660 | 1/1979 | Lasky | 428/403 |
| 4,209,567 | 6/1980 | Takahara | 428/403 |

FOREIGN PATENT DOCUMENTS 81446 6/1980 Japan .......................... 252/301.4 S

*Primary Examiner*—Ellis P. Robinson
*Attorney, Agent, or Firm*—Cushman, Darby & Cushman

[57] ABSTRACT

Disclosed is a filter-coated phosphor having phosphor particles coated with filter particles formed of pigments of the same color as that of light emitted from the phosphor, the phosphor particles coated with the filter particles being additionally coated with a borate compound. According to this filter-coated phosphor, the filter particles never exfoliate from the surfaces of the phosphor particles in a slurry, satisfactory dispersibility is obtained in the slurry, and the slurry pH is stable. A phosphor screen of a color picture tube obtained with use of the filter-coated phosphor exhibits highly outstanding contrast and luminous efficiency.

8 Claims, 1 Drawing Figure

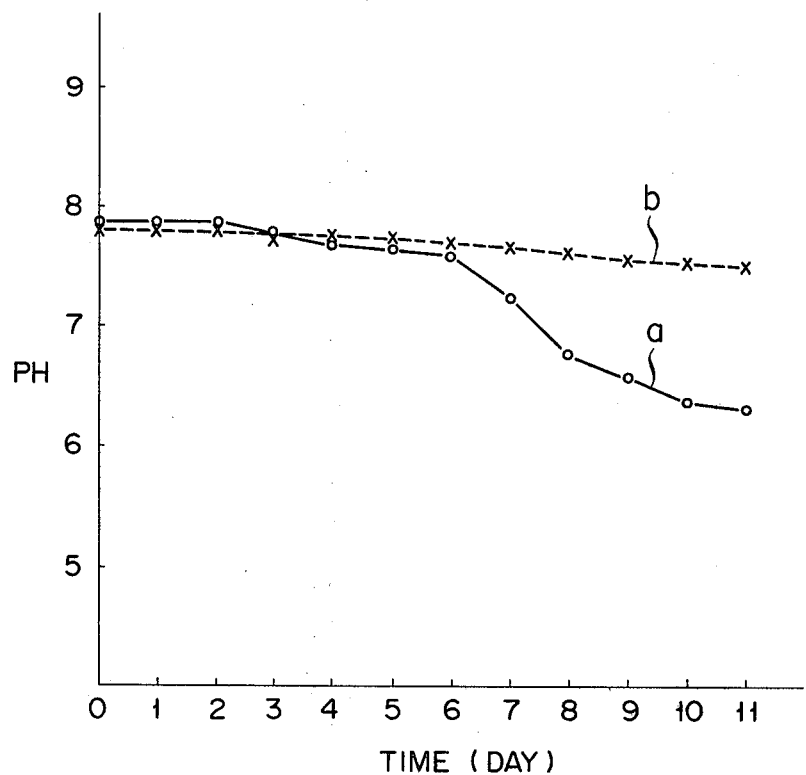

FILTER-COATED PHOSPHOR

This invention relates to a filter-coated phosphor including phosphor particles coated with filter particles, more specifically to an improvement of a filter-coated phosphor used for phosphor screens of color picture tubes.

Conventionally, in order to improve the contrast property of picture images projected on a phosphor screen of a color picture tube, filter material is caused to absorb external light by using a filter-coated phosphor formed of phosphor particles coated with filter particles. Filter materials to constitute these filter particles include pigments of the same colors as those of phosphors emitting blue, red and green colors which are used for the phosphor screens of color picture tubes. For example, there may be used blue pigments such as cobalt aluminate and ultramarine blue for blue-emitting phosphors such as ZnS/Ag,Cl and ZnS/Ag,Al, red pigments such as red iron oxide, cadmium sulfoselenide and indium sulfide, a newly developed filter material, for red-emitting phosphors such as $Y_2O_2S/Eu$, $Y_2O_3/Eu$, and $YVO_4/Eu$, and green pigments such as chromium oxide and a mixture of yellow cadmium sulfoselenide and bluish green cobalt aluminate for green-emitting phosphors such as Zns/Cu,Al and (ZnCd)S/Cu,Al.

As methods for coating phosphor particles with filter particles, various measures to bond or fix the filter particles to the surfaces of the phosphor particles by means of organic binders have hitherto been put to practical use. For example, there are proposed a method using gelatin (Japanese Patent Disclosure No. 56146/75), a method using colloidal particles in acrylic resin emulsion (Japanese Patent Disclosure No. 109488/77), a method using acidic and basic polymers (Japanese Patent Disclosure No. 3980/78), a method using gelatin and gum arabic (Japanese Patent Disclosure No. 5088/78), etc.

Filter-coated phosphors prepared by those methods, however, are poor in dispersibility in slurry because phosphor particles are liable to cohere. Accordingly, phosphor layers formed from a slurry containing such filter-coated phosphor are low in packing density, and hence are susceptible to significant perforation. Further, prolonged stirring of the slurry will allow polyvinyl alcohol in the slurry to be decomposed or deteriorated by the action of bacteria, causing pH variations of the slurry. The phosphor layers formed by using the slurry with such unstable pH values will suffer more significant perforation besides the aforesaid perforation due to poor dispersibility. This phenomenon is expressly noticeable where gelatin, which may easily be decomposed by bacteria, is used as the organic binder or if $Y_2O_2S/Eu$ is used as the phosphor. Such perforation of varied degrees will reduce the luminous efficiency of the phosphor layers. Thus, satisfactory phosphor layers cannot be obtained with the prior art methods using organic binders.

Moreover, if a phosphor screen is formed by coating a glass faceplate, which is previously coated with blue and green phosphors, with a conventional slurry prepared from a filter-coated red phosphor, especially a red phosphor coated with indium sulfide as the filter material, then such phosphor screen will suffer the so-called "color blend" or a phenomenon that the red phosphor remains on blue or green phosphor layers, reducing the luminous brightness of the blue or green phosphor layers. This may be caused because indium sulfide as the filter material, having active surface, is liable to be adsorbed by the blue or green phosphor layers.

Although not in practical use yet, there is proposed a method to fix the filter particles on the surfaces of the phosphor particles by means of inorganic material. This method utilizes silica or water-insoluble metal silicate for the binder (Japanese Patent Disclosure No. 28785/79). In a filter-coated phosphor prepared by such method, however, silica or water-insoluble metal silicate will accelerate the cohesion of the filter particles which are fine particles with the mean diameter of 0.2 to 0.5μ, and even the cohesion of the phosphor particles, so that resultant phosphor layers will be liable to coagulation and hence to substantial perforation. Thus, even this method cannot provide phosphor layers with satisfactory properties.

The object of this invention is to provide a filter-coated phosphor affording a high-luminous brightness phosphor layer with improved slurry dispersibility and contrast property without involving the possibility of exfoliation of filter particles from the surfaces of phosphor particles in a slurry.

According to the invention, there may be provided a filter-coated phosphor having phosphor particles coated with filter particles formed of pigments of the same color as that of light emitted from the phosphor, the phosphor particles coated with the filter particles being additionally coated with a borate compound.

This invention can be more fully understood from the following detailed description when taken in conjunction with the accompanying drawing, in which:

The FIGURE is a graph showing pH changes of a slurry containing the filter-coated phosphor of this invention as compared with a slurry containing the prior art filter-coated phosphor.

In the filter-coated phosphor of this invention, phosphor particles coated with filter particles with or without use of an organic binder are additionally coated with a borate compound, thereby eliminating the drawbacks of the prior art filter-coated phosphor.

Water-insoluble metal borates are preferably used for the borate compound to be applied to the phosphor of this invention. These borates include borates of any other metals than alkali metals, such as zinc borate, aluminum borate, barium borate, calcium borate, strontium borate, etc. Water-soluble metal borates such as alkali metal borates are not preferred because they dissolve in slurry and cannot cover the surfaces of phosphor particles.

Now there will be described a method for preparing the filter-coated phosphor.

First, a phosphor is dispersed in deionized water, and a pigment thoroughly dispersed in deionized water is admixed with the slurry. Then, an aqueous solution of $Na_2B_4O_7$ is added to the mixture and fully stirred. Further, metal sulfate and/or metal nitrate (e.g., zinc sulfate, aluminum sulfate, calcium nitrate, strontium nitrate, zinc nitrate, aluminum nitrate, barium nitrate, etc.) are added and thoroughly stirred. Thus, filter particles are put on the surfaces of the phosphor particles, which are additionally coated with metal borate. The metal borate may be fixed on the surfaces of the filter-coated phosphor particles by filtering the aqueous solution to separate solid matter therefrom and drying the solid matter. In order to increase the bonding strength between the metal borate and the filter-coated phosphor particles, the filter-coated phosphor particles additionally coated with the borate compound may be baked at a temperature of 300° to 400° C.

Although there has been described a method using no organic binder in fixing filter particles on the surfaces of phosphor particles, organic binders may be used in some cases. If filter particles are fixed on the surfaces of phosphor particles by means of an organic binder and a borate compound is additionally put on the surfaces, the drawback of the prior art filter-coated phosphor obtained with use of the organic binder, i.e. the poorness in water dispersibility due to the existence of the organic binder, will be eliminated by the effect of the borate compound coating. Moreover, the adhesive strength provided by the organic binder is combined with the adhesive strength of the borate compound to increase the bonding strength between the filter particles and the phosphor particles, so that the filter particles may be prevented from exfoliating from the surfaces of the phosphor particles in a slurry.

Now there will be described the quantity of borate compound for coating. In the conventional filter-coated phosphor in practical use, the weight of filter particles for coating generally is 5% or less of the weight of phosphor particles. The weight of borate compound for coating, which depends on the weight of the filter particle coating, is preferably 0.001 to 0.3% of that of the phosphor particles, more preferably 0.01 to 0.1%, where the weight of the filter particle coating is 5% or less of that of the phosphor particles. If the weight of the borate compound coating is less than 0.001% of that of the phosphor particles, the borate compound used will be of no good, allowing exfoliation of the filter particles in the slurry. If the quantity of the borate compound coating exceeds 0.3 wt. %, on the other hand, the phosphor particles will be deteriorated in dispersibility in the slurry, making it impossible to obtain satisfactory phosphor layers.

Red-emitting phosphors applicable to this invention include yttrium oxysulfide activated by europium ($Y_2O_2S/Eu$), gadolinium oxysulfide activated by europium ($Gd_2O_2S/Eu$), yttrium oxide activated by europium ($Y_2O_3/Eu$), yttrium vanadate activated by europium ($YVO_4/Eu$), zinc orthophosphate activated by manganese ($Zn_3(PO_4)_2/Mn$), etc. For filter materials used with these red-emitting phosphors, there are red iron, chrome vermilion, antimony red, cadmium sulfoselenide, indium sulfide, etc. Indium sulfide is a newly developed red filter material. In particular, the borate compound coating will prevent the so-called "color blend" that phosphors coated with such indium sulfide have conventionally suffered. The reason is that the indiumsulfide-coated phosphors, which are naturally liable to be adsorbed by blue- or green-emitting phosphors due to the activity of their surfaces, are reduced in the surface activity by the effect of the borate compound coating, thereby decreasing their adsorbability to the blue- or green-emitting phosphors. Table 1 shows the results of visual observation of the degree of color blend depending on the amount of borate compound for coating.

TABLE 1

| | Amount of boric compound | Degree of color blend |
|---|---|---|
| Red-emitting phosphor coated with indium sulfide | 0 | C |
| Red-emitting phosphor coated with indium sulfide | 0.001 wt.% | B |
| Red-emitting phosphor coated with indium sulfide | 0.01 wt. % | A |
| Red-emitting phosphor coated with indium sulfide | 0.1 wt. % | A |

A: No color blend.
B: Some color blend but practically insignificant.
C: Significant color blend. Unpractical.

According to the results of visual examination, moreover, a phosphor slurry which was prepared with use of a phosphor formed of filter-coated yttrium oxysulfide/Eu additionally coated with a borate compound displayed stable pH value after prolonged stirring, involving neither serious perforation in phosphor layers nor exfoliation of phosphor dots or stripes which would conventionally be caused by variations in pH. Accordingly, the slurry may enjoy prolonged life, and the deterioration of the luminous efficiency of the phosphor layers may be avoided. The pH value of the phosphor slurry was stabilized because the sterilizing effect of the borate compound prevented polyvinyl alcohol or organic binder in the slurry from being deteriorated or decomposed by the action of bacteria that had probably been the main cause of the pH variations.

The accompanying drawing is a graph showing pH variations of aqueous slurry containing red-iron-coated yttrium oxysulfide/Eu for the comparison between the prior art phosphor and the phosphor of the invention. In this drawing, a solid line a represents pH variations of the prior art phosphor using no borate compound, while a broken line b represents pH variations of the phosphor of the invention using a borate compound.

Blue-emitting phosphors applicable to this invention include zinc sulfide activated by silver (ZnS/Ag), zinc sulfide activated by silver and aluminum (ZnS/Ag,Al), zinc sulfide activated by silver and chlorine (ZnS/Ag,Cl), etc. For filter materials used with these phosphors, there are cobalt aluminate, ultramarine blue, cerulean blue, etc.

Green-emitting phosphors applicable to this invention include zinc sulfide activated by copper and aluminum (ZnS/Cu,Al), zinc sulfide activated by copper and chlorine (ZnS/Cu,Cl), zinc cadmium sulfide activated by copper and aluminum ((ZnCd)S/Cu,Al), zinc oxide activated by zinc (ZnO/Zn), zinc sulfide activated by gold, copper and aluminum (ZnS/Au,Cu,Al), etc. For filter materials used with these phosphors, there are chromium oxide, cobalt green, titanium yellow, zinc iron yellow, cadmium yellow, etc.

According to the phosphor of this invention formed of filter-coated phosphor particles additionally coated with a borate compound, as described above, there may be provided various advantages; good dispersibility in slurry, minimized exfoliation of filter particles in slurry, stabilized slurry pH, and prevention of color blend in phosphor screen. The phosphor screen of a color picture tube obtained with use of the filter-coated phosphor of the invention exhibits outstanding contrast and luminous efficiency.

Several examples of this invention are given below.

EXAMPLE 1

1 kg of $Y_2O_2S/Eu$ as a phosphor is dispersed in 2 l of deionized water. Then, 42 g of indium chloride (3 wt. % of phosphor in terms of $In_2S_2$) dissolved in deionized water is added and fully stirred. Then, $H_2S$ gas is passed through the mixture to cause the phosphor to adsorb indium sulfide thereon. After washed once or twice in water, the solid portion is filtered out and dried, and 75 g of sulfur and 18 g of sodium carbonate are mixed and filled into a silica crucible for one hour's sintering at 800° C. The sintered product is washed twice or thrice by deionized water and dried. Thereafter, when the dried solid portion is baked at 480° C. for an hour, the phosphor is covered with red indium sulfide. The phosphor coated with red indium sulfide is dispersed in deionized water by using a ball mill to obtain 2 l of slurry. 80 cc of 11% solution of $Na_2B_4O_7$ is added to the slurry and fully stirred. Further, 400 cc of 0.4 mol solution of $ZnSO_4$ is added and fully stirred. Solid material obtained by filtering the resultant mixture is dried at 120° C. The dried product is sifted out by using a 300-mesh sieve, and thus an indium-sulfide-coated phosphor ($Y_2O_2S/Eu$) additionally coated with zinc borate is obtained.

A phosphor slurry was prepared by the conventional method with use of the phosphor obtained in the aforesaid manner, and applied to a cathode-ray tube panel in the known procedures. Then, a phosphor film thus obtained exhibited good contrast and luminous brightness (see Table 3) without mixing in color with other phosphor film layers. In the slurry, moreover, there was noticed no exfoliation of filter material.

Table 2 shows findings on the relationship between the elapse of time before use after the phosphor slurry is prepared and the degree of dot exfoliation.

TABLE 2

|  | Time for use | | | |
| --- | --- | --- | --- | --- |
|  | 1 day after prep. | 4 days after prep. | 7 days after prep. | 10 days after prep. |
| State of phosphor without boric compound coating | Good | Partial dot exfoliation | Dot exfoliation | |
| State of phosphor of the invention | Good | Good | Good | Partial dot exfoliation |

It may be seen from Table 2 that the use of the slurry containing the phosphor of the invention will reduce the dot exfoliation of phosphor by a large margin.

EXAMPLE 2

1 kg of $Y_2O_2S/Eu$ as a phosphor is dispersed in approximately 2 l of deionized water. Then, 42 g of indium chloride dissolved in deionized water is added and fully stirred. Then, $H_2S$ gas is passed through the mixture to cause the phosphor to adsorb indium sulfide thereon. After washed once or twice in water, the solid portion is filtered out and dried, and 18 g of sodium carbonate and 75 g of sulfur are mixed and filled into a silica crucible for one hour's sintering at 800° C. The sintered product is washed twice or thrice, and dispersed for 20 minutes by using a ball mill. Thereafter, 40 cc of 11% solution of $Na_2B_4O_7$ is added and stirred for 20 to 30 minutes in the same manner as Example 1. Then, 200 cc of 0.4 mol solution of barium nitrate ($Ba(NO_3)_2$) is added and fully stirred. After washed several times with deionized water, solid matter obtained by filtration is dried and sifted, and thus an indium-sulfide-coated phosphor ($Y_2O_2S/Eu$) additionally coated with barium borate is obtained.

A phosphor slurry was prepared with use of the phosphor obtained in the aforesaid manner, and applied to a cathode-ray tube panel in the known-procedures. A phosphor film thus obtained suffered no color mixture with other phosphor film layers. Further, a phosphor film obtained by baking such film at 450° C. for about one hour exhibited good contrast and luminous brightness (see Table 3).

EXAMPLE 3

1 kg of $Y_2O_2S/Eu$ as a phosphor is dispersed in 2 l of deionized water, and 1 g of well dispersed red iron oxide is added and fully stirred. 10 cc of 11% solution of $Na_2B_4O_7$ is added to the resultant solution, and 50 cc of 0.4 mol solution of $ZnSO_4$ is further added and thoroughly stirred. Then, solid matter obtained by filtering the mixture is dried and sifted by using a 300-mesh sieve, and thus a red-iron-oxide-coated phosphor ($Y_2O_2S/Eu$) additionally coated with zinc borate is obtained.

The solution of $ZnSO_4$ may be replaced with $Zn(NO_3)_2.6H_2O$, $A_2(SO_4)_3$ or $Ba(NO_3)_2$.

A phosphor slurry prepared with use of the phosphor obtained in the aforesaid manner exhibited stable pH values after prolonged stirring. When this slurry was applied to a cathode-ray tube panel in the known procedures, a resultant phosphor film exhibited good contrast and luminous brightness (see Table 3).

EXAMPLE 4

1 l of deionized water, 1 kg of ZnS/Ag as a blue-emitting phosphor, 20 g of well dispersed cobalt aluminate, and 0.05 wt. % of acrylic resin emulsion (Nippon Acryl HA-24) are dispersed and admixed by ball-milling for 10 minutes. Then, the pH value of this mixture is adjusted to 2 to 3 by using 0.1 mol sulfuric acid. Further, 40 cc of 0.1 g/cc solution of $Al(NO_3)_3.9H_2O$ is added and ball-milled for 10 minutes. The mixture is removed from the ball mill, admixed with deionized water to make up the volume to 15 l, and stirred for 3 hours. Solid portion of the mixture is put in a ball mill pot for 10 minutes' ball-milling, taken out of the pot, and admixed with deionized water to make up the volume to 15 l. Then, the pH value of the mixture is adjusted to 7 to 8 by using a solution of $NH_4OH$, and the mixture is stirred for an hour. After washing the mixture 5 or 6 times with deionized water, 40 cc of 11% solution of $Na_2B_4O_7$ and 200 cc of 0.4 mol solution of $ZnSO_4$ are added in succession and stirred thoroughly. Solid matter obtained by filtering the mixture is dried and sifted out by using a 300-mesh sieve, and thus a cobalt-aluminate-coated phosphor (ZnS/Ag) additionally coated with zinc borate is obtained.

A phosphor slurry was prepared with use of the phosphor obtained in the aforesaid manner, and applied to a cathode-ray tube panel in the known procedures. Then, a phosphor film thus obtained exhibited good contrast and luminous brightness (see Table 3), and there was noticed no exfoliation of filter material in the slurry.

EXAMPLE 5

2 l of deionized water, 1 kg of $Y_2O_2S/Eu$ as a red-emitting phosphor, 10 g of well dispersed red iron oxide, and 0.02 wt. % of acrylic resin emulsion are dispersed and admixed by ball-milling for 10 minutes. Then, the pH value of this mixture is adjusted to 2 or 3 using 0.1 mol $H_2SO_4$, and mixture is subjected to additional 10 minutes' ball-milling. Subsequently, 40 cc of 0.1 g/cc solution of $Al(NO_3)_3.9H_2O$ is added and ball-milled for further 10 minutes. Then, the mixture is removed from the ball mill, admixed with deionized water to make up the volume to 15 l, and stirred for 3 hours. Then, the pH value of the mixture is adjusted to 7 or 8 by using a solution of $NH_4OH$, and the mixture is stirred for an hour. After washing the mixture several times with deionized water, 40 cc of 11% solution of $Na_2B_4O_7$ is added and stirred for 30 minutes. Further, 200 cc of 0.4 mol solution of $ZnSO_4$ is added and fully stirred. After stirring, the mixture is washed several times with deionized water, and filtered. Solid matter obtained by such filtration is dried and sifted out by using a 300-mesh sieve, and thus a red-iron-oxide-coated phosphor ($Y_2O_2S/Eu$) additionally coated with zinc borate is obtained.

A phosphor slurry prepared with use of the phosphor obtained in the aforesaid manner exhibited stable pH values after prolonged stirring. When this slurry was applied to a cathode-ray tube panel in the known procedures, a resultant phosphor film exhibited good contrast and luminous brightness (see Table 3). In the slurry, moreover, there was noticed no exfoliation of filter material.

EXAMPLE 6

1 kg of ZnS/Ag as a blue-emitting phosphor is dispersed in 2 l of deionized water. Then, 10 g of well dispersed ultramarine blue as filter material is added and fully stirred, and thereafter ball-milled for 10 minutes. Then, deionized water is added to the mixture to make up the volume to 10 l. Further, 40 cc of 11% solution of $Na_2B_4O_7$ is added and stirred for 20 to 30 minutes. Subsequently, 200 cc of 0.4 mol solution of aluminum sulfate is added and fully stirred. After washing the mixture several times with deionized water, solid material obtained by filtration is dried and sifted out, and thus an ultramarine-blue-coated phosphor (ZnS/Ag) additionally coated with aluminum borate is obtained.

A phosphor slurry was prepared with use of the phosphor obtained in the aforesaid manner, and applied to a cathode-ray tube panel in the known procedures. Then, a phosphor film thus obtained exhibited good contrast and luminous brightness (see Table 3).

EXAMPLE 7

2 l of deionized water, 1 kg of ZnS/Cu,Al as a green-emitting phosphor, 10 g of well dispersed zinc iron yellow, and 0.02 wt. % of acrylic resin emulsion (Nippon Acryl HA-24) are dispersed and admixed by ball-milling for 10 minutes. Then, the pH value of this mixture is adjusted to 3 by using 0.1 mol sulfuric acid, and the mixture is stirred for 20 to 30 minutes.

Subsequently, 40 cc of 0.1 g/cc solution of $Al(NO_3)_3.9H_2$ is added and stirred for 20 minutes. Thereafter, deionized water is added to the mixture to make up to volume to 15 l, and the mixture is stirred for 3 hours. Then, solid portion of the mixture is put in a ball mill pot for 10 minutes' ball-milling, taken out of the pot, and admixed with deionized water to make up the volume to 15 l. Then, the pH value of the mixture is adjusted to 7 or 8 by using a solution of $NH_4OH$, and the mixture is stirred for an hour. After washing the mixture 4 or 5 times with deionized water, 40 cc of 11% solution of $Na_2B_4O_7$ and 200 cc of 0.4 mol solution of $ZnSO_4$ are added in succession and stirred thoroughly. After washed several times with deionized water, solid matter obtained by filtration is dried and sifted out by using a 300-mesh sieve, and thus a zinc-iron-yellow-coated phosphor (ZnS/Cu,Al) additionally coated with zinc borate is obtained.

A phosphor slurry was prepared with use of the phosphor obtained in the aforesaid manner, and applied to a cathode-ray tube panel in the known procedures. Then, a phosphor film thus obtained exhibited good contrast and luminous brightness (see Table 3), and there was noticed hardly any exfoliation of filter material in the slurry.

EXAMPLE 8

2 l of deionized water, 1 kg of ZnS/Au,Cu,Al as a green-emitting phosphor, and 10 g of well dispersed zinc iron yellow are admixed and ball-milled for 10 minutes. Then, deionized water is added to make up the volume to 10 l. 40 cc of 11% solution of $Na_2B_4O_7$ is added to the mixture and stirred for 30 minutes. Further, 200 cc of 0.4 mol solution of strontium nitrate is added and stirred thoroughly. After stirring, the mixture is washed several times with deionized water, and filtered. Solid matter obtained by such filtration is dried and sifted out by using a 300-mesh sieve, and thus a zinc-iron-yellow-coated phosphor (ZnS/Au,Cu,Al) additionally coated with strontium borate is obtained.

A phosphor slurry was prepared with use of the phosphor obtained in the aforesaid manner, and applied to a cathode-ray tube panel in the known procedures. Then, a phosphor film thus obtained exhibited good contrast and luminous brightness (see Table 3).

TABLE 3

Phosphor-screen luminous brightness of filter-coated phosphor additionally coated with borate compound

| Example | Blue-filter-coated phosphor | Green-filter-coated phosphor | Red-filter-coated phosphor | Remarks Phosphor & filter material |
|---|---|---|---|---|
| 1 | | | 110% (100) | $Y_2O_2S/Eu$ + $In_2S_3$ |
| 2 | | | 110% (100) | $Y_2O_2S/Eu$ + $In_2S_3$ |
| 3 | | | 108% (100) | $Y_2O_2S/Eu$ + red ion oxide |
| 4 | 108% (100) | | | ZnS/Ag + cobalt aluminate |
| 5 | | | 109% (100) 107% (100) | $Y_2O_2S/Eu$ + $In_2S_3$ $Y_2O_2S/Eu$ + red iron oxide |
| 6 | 107% (100) | | | ZnS/Ag + ultramarine blue |
| 7 | | 106% (100) | | ZnS/Cu,Al + zinc iron yellow |
| 8 | | 105% (100) | | ZnS/Au,Cu,Al + zinc iron yellow |

*Numerical value in parenthesis is luminous brightness of phosphor screen formed of same phosphor without borate compound coating.

What we claim is:

1. A filter-coated phosphor having phosphor particles coated with filter particles formed of pigments of the same color as that of light emitted from said phosphor, said phosphor particles coated with said filter particles being additionally coated with a borate compound wherein the weight of phosphor particles, and the weight of said borate compound coating is 0.001 to 0.3% of the weight of the phosphor compound.

2. A filter-coated phosphor according to claim 1, wherein said borate compound is water-insoluble metal borate.

3. A filter-coated phosphor according to claim 2, wherein said water-insoluble metal borate is a borate of a metal other than alkali metals.

4. A filter-coated phosphor according to claim 3, wherein said borate is selected among a group consisting of zinc borate, aluminum borate, barium borate, calcium borate, and strontium borate.

5. A filter-coated phosphor according to claim 1, wherein the weight of said borate compound coating is 0.001 to 0.1% of the weight of the phosphor particles.

6. A filter-coated phosphor according to claim 1, wherein said filter-coated phosphor is a red-emitting phosphor coated with indium sulfide.

7. A filter-coated phosphor according to any one of claims 1 to 6, wherein said filter particles are fixed on the phosphor particles by means of an organic binder.

8. A filter-coated phosphor according to claim 7, wherein said organic binder is acrylic resin emulsion.